United States Patent
Jaradi et al.

(10) Patent No.: US 10,035,484 B2
(45) Date of Patent: Jul. 31, 2018

(54) AIRBAG ASSEMBLY

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/396,995

(22) Filed: Jan. 3, 2017

(65) Prior Publication Data

US 2018/0186325 A1    Jul. 5, 2018

(51) Int. Cl.
| | |
|---|---|
| *B60R 21/16* | (2006.01) |
| *B60R 21/207* | (2006.01) |
| *B60R 21/2338* | (2011.01) |
| *B60R 21/2342* | (2011.01) |
| *B60R 21/2334* | (2011.01) |
| *B60R 21/233* | (2006.01) |
| *B60R 21/215* | (2011.01) |
| *B60R 21/231* | (2011.01) |

(52) U.S. Cl.
CPC .......... *B60R 21/207* (2013.01); *B60R 21/215* (2013.01); *B60R 21/233* (2013.01); *B60R 21/2334* (2013.01); *B60R 21/2338* (2013.01); *B60R 21/2342* (2013.01); *B60R 2021/23153* (2013.01); *B60R 2021/23316* (2013.01); *B60R 2021/23386* (2013.01)

(58) Field of Classification Search
CPC .................. B60R 21/207; B60R 21/21; B60R 2021/21512; B60R 2021/23519; B60R 2021/0407; B60R 2021/23153
USPC ................................ 280/728.2, 730.1, 730.2
See application file for complete search history.

(56) References Cited

U.S. PATENT DOCUMENTS

| | | | | |
|---|---|---|---|---|
| 5,738,368 A | * | 4/1998 | Hammond | ............... B60N 2/68 280/730.1 |
| 8,398,113 B2 | * | 3/2013 | Choi | ..................... B60R 21/207 280/730.1 |
| 9,308,882 B2 | * | 4/2016 | Nagasawa | ............. B60R 21/013 |
| 9,308,883 B1 | * | 4/2016 | Schneider | ............. B60R 21/231 |
| 9,409,539 B2 | * | 8/2016 | Nagasawa | ............ B60N 2/4228 |

(Continued)

FOREIGN PATENT DOCUMENTS

| | | |
|---|---|---|
| DE | 10201836 A1 | 8/2003 |
| JP | 2894194 B2 | 3/1999 |

(Continued)

OTHER PUBLICATIONS

"New airbag technologies help improve rear seat safety," TRW; Auto Safety News and expert insight; Dec. 3, 2014; 2 pages.

*Primary Examiner* — Toan C To
(74) *Attorney, Agent, or Firm* — Frank A. MacKenzie; Bejin Bieneman PLC (57) ABSTRACT

A seat in a vehicle includes a seatback and an airbag assembly. The seatback includes a frame and an upholstery supported by the frame. The upholstery includes an inner surface facing the frame. The airbag assembly is fixed to the inner surface of the upholstery. The airbag assembly of the seat provides coverage of the seatback so as to absorb impact energy for knees and a head of an occupant seated behind the seat.

20 Claims, 10 Drawing Sheets

(56) References Cited

U.S. PATENT DOCUMENTS

| | | | |
|---|---|---|---|
| 9,573,554 B2* | 2/2017 | Nagasawa | B60N 2/4228 |
| 9,586,552 B1* | 3/2017 | Whitens | B60R 21/207 |
| 9,623,826 B2* | 4/2017 | Weng | B60R 21/207 |
| 9,707,873 B2* | 7/2017 | Line | B60N 2/503 |
| 9,707,921 B2* | 7/2017 | Fischer | B60R 21/231 |
| 2005/0023806 A1* | 2/2005 | Higuchi | B60R 21/231 |
| | | | 280/730.1 |
| 2013/0341975 A1 | 12/2013 | Schneider et al. | |
| 2015/0091281 A1* | 4/2015 | Nagasawa | B60N 2/4228 |
| | | | 280/730.1 |
| 2017/0320460 A1* | 11/2017 | Roychoudhury | B60R 21/233 |

FOREIGN PATENT DOCUMENTS

| | | |
|---|---|---|
| JP | 2010052621 A | 3/2010 |
| KR | 2019990026012 U | 7/1999 |

\* cited by examiner

AIRBAG ASSEMBLY

BACKGROUND

A vehicle, such as an automobile, may include multiple rows of seating. Seats in each row may be bucket seats, bench seats, or other kinds, and the seats may face forward relative to the vehicle. The seats include seat bottoms on which occupants sit and seatbacks against which occupants rest their backs. The seat bottoms are generally horizontal and the seatbacks are generally upright.

In a frontal vehicle impact, an occupant may contact the seatbacks of the row of seating in front of the occupant. During the impact, the vehicle decelerates before the occupant decelerates. When the vehicle has decelerated but the occupant still has forward momentum, the occupant leans forward and may slide forward. This motion may bring the head or the knees of the occupant in contact with the seatback in front of the occupant.

DETAILED DESCRIPTION

With reference to the Figures, wherein like numerals indicate like parts throughout the several views, a seat 32 in a vehicle 30 includes a seatback 34 and an airbag assembly 40. The seatback 34 includes a frame 42 and an upholstery 44 supported by the frame 42. The upholstery 44 includes an inner surface 46 facing the frame 42. The airbag assembly 40 is fixed to the inner surface 46 of the upholstery 44.

The airbag assembly 40 of the seat 32 provides coverage of the seatback 34 so as to absorb impact energy for knees and a head of an occupant seated behind the seat 32, and reduce the likelihood of injury. The airbag assembly 40 takes up little space in the seatback 34 in a vertical direction, allowing the space to be used for other purposes, such as a pocket (not shown) on the seatback 34 located downward from the airbag assembly 40 and/or an entertainment center (not shown) located upward from the airbag assembly 40.

Figure 1:
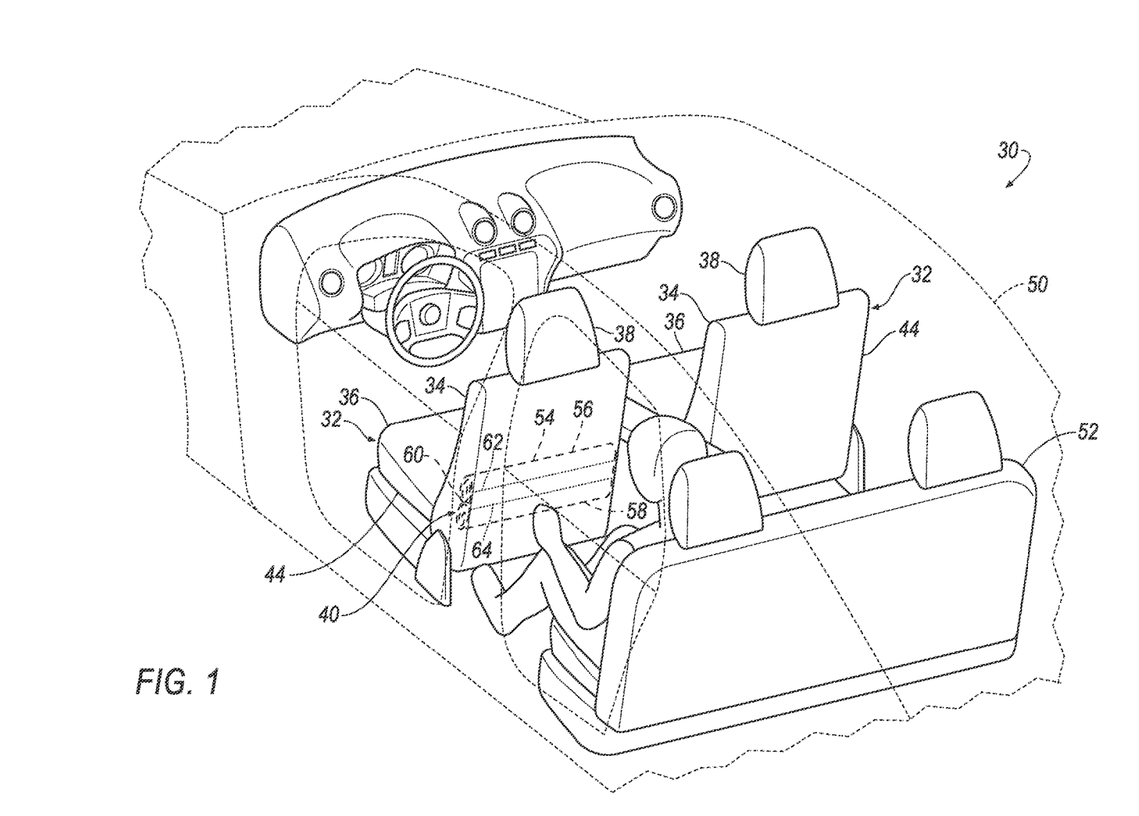
FIG. 1 is a perspective view of a vehicle with an airbag assembly in an undeployed position.
Figure 2A:
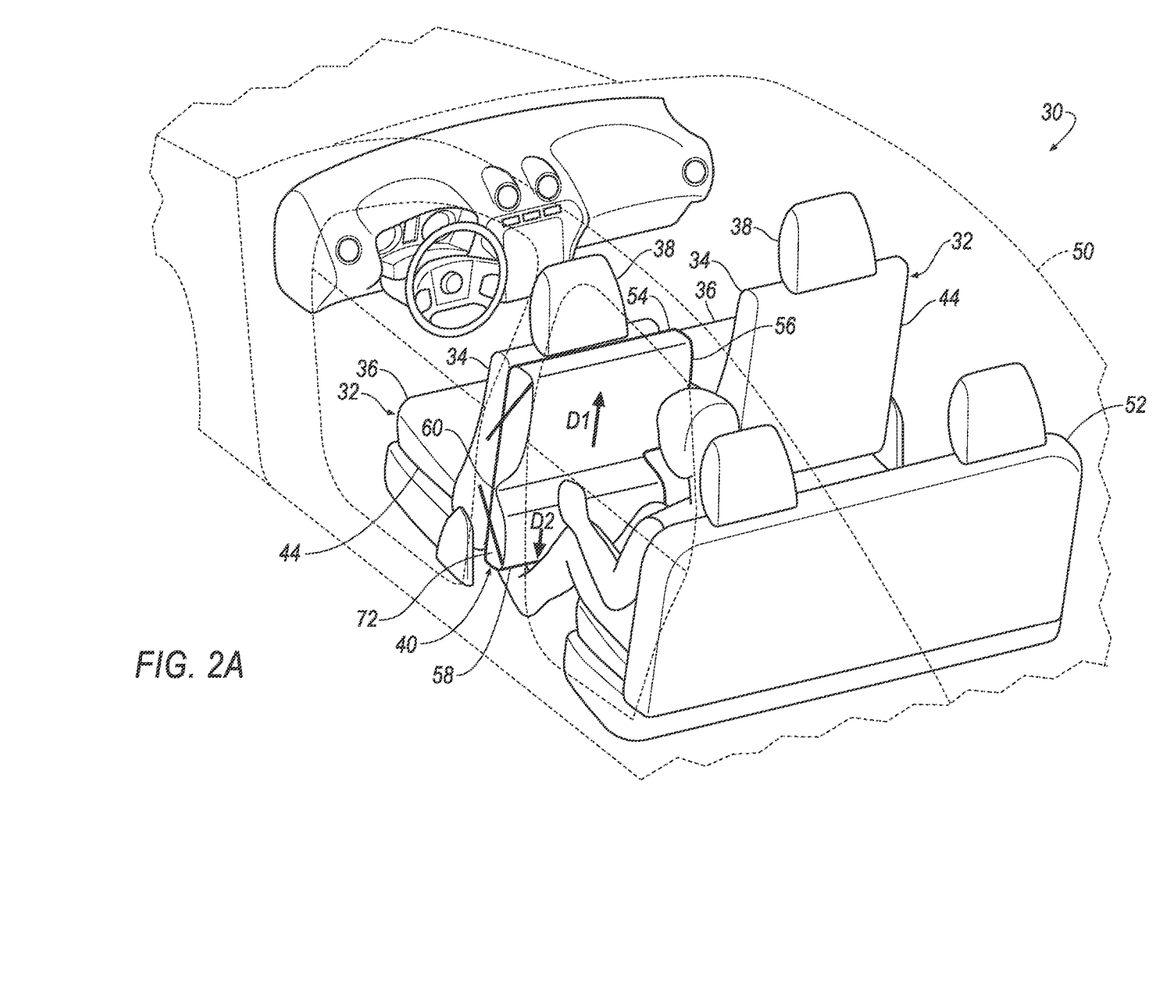
FIG. 2A is a perspective view of the vehicle with the airbag assembly in a deployed position.
Figure 2B:
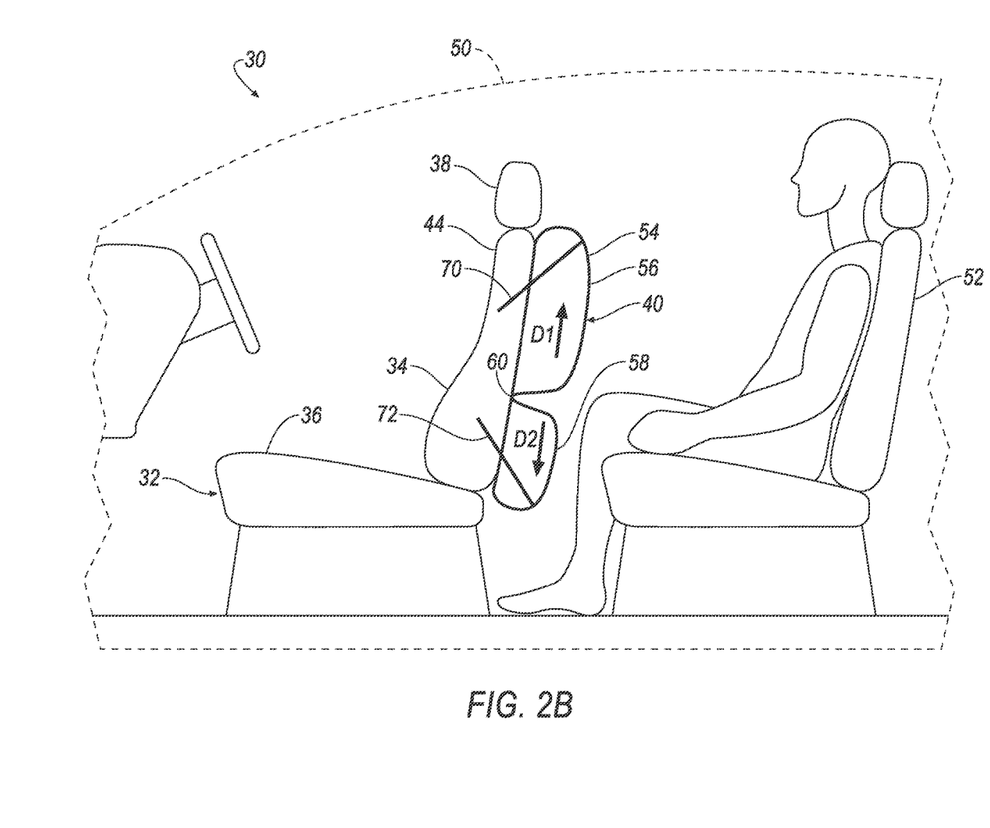
FIG. 2B is a side view of the vehicle with the airbag assembly in the deployed position.

With reference to FIGS. 1-2A, the vehicle 30 includes a passenger cabin 50 to house occupants, if any, of the vehicle 30. The passenger cabin 50 includes one or more of the seats 32 disposed at a front of the passenger cabin 50 and one or more rear seats 52 disposed behind the seats 32. The passenger cabin 50 may also include third-row seats (not shown) at a rear of the passenger cabin 50, in which case the seats 32 including the airbag assembly 40 may be second-row seats instead of or in addition to being front seats. In the Figures, the seat 32 is shown to be a bucket seat, but the seat 32 may be another type. The position and orientation of the seats 32 and components thereof may be adjustable by an occupant.

With reference to FIGS. 3A-B and 5A-6B, the seat 32 may include the seatback 34, a seat bottom 36, and a headrest 38. The headrest 38 may be supported by the seatback 34 and may be stationary or movable relative to the seatback 34. The seatback 34 may be supported by the seat bottom 36 and may be stationary or movable relative to the seat bottom 36. The seatback 34 includes the frame 42 and the upholstery 44 supported by the frame 42. The seatback 34, the seat bottom 36, and/or the headrest 38 may be adjustable in multiple degrees of freedom. Specifically, the seatback 34, the seat bottom 36, and/or the headrest 38 may themselves be adjustable, in other words, may have adjustable components within themselves, and/or may be adjustable relative to each other.

The frame 42 may include panels and/or may include tubes, beams, etc. The frame 42 may be formed of any suitable plastic material, e.g., carbon fiber reinforced plastic (CFRP), glass fiber-reinforced semi-finished thermoplastic composite (organosheet), etc. Alternatively, for example, some or all components of the frame 42 may be formed of a suitable metal, e.g., steel or aluminum.

The upholstery 44 may be formed of cloth, leather, faux leather, or any other suitable material. The upholstery 44 may be stitched in panels around the frame 42 and/or one or more cushions (not shown). The upholstery 44 may include the inner surface 46 facing the frame 42 and an outer surface 48 opposite the inner surface 46. In other words, the outer surface 48 faces away from the frame 42. The outer surface 48 may have a class A surface, i.e., a surface specifically manufactured to have a high-quality, finished aesthetic appearance free of blemishes. The seatback 34 may include padding, e.g., foam, between the inner surface 46 of the upholstery 44 and the frame 42.

With continued reference to FIGS. 3A-B and 5A-6B, the airbag assembly 40 includes an airbag 54. The airbag 54 is deployable from an undeployed position, shown in FIGS. 1, 3A, 4, 5A, and 6A, to a deployed position, shown in FIGS. 2A, 2B, 3B, 5B, and 6B. The airbag 54 has an upper section 56 deployable in a first direction D1 and a lower section 58 deployable in a second direction D2 opposite the first direction D1. The first direction D1 may be a generally upward direction parallel to the seatback 34, and the second direction D2 may be a generally downward direction parallel to the seatback 34. In the deployed position, the airbag 54 is positioned between the seatback 34 and the rear seat 52 in a vehicle-rearward direction from the seatback 34.

The airbag 54 includes a middle section 60 extending from the upper section 56 to the lower section 58. When the airbag 54 deploys, the upper section 56 and the lower section 58 move from the undeployed position to the deployed position, and the middle section 60 remains in the same position. The airbag assembly 40 may include any one, or combinations, of the additional components described in particular embodiments below.

The airbag 54 may be formed of any suitable airbag material, for example, a woven polymer. For example, the airbag 54 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag assembly 40 is fixed to the inner surface 46 of the upholstery 44. In other words, the airbag assembly 40 is directly attached to the inner surface 46, that is, attached to with no intermediate components. The airbag assembly 40 may be fixed to the inner surface 46 via stitching 68, adhesives, etc., as described in more detail below with respect to particular embodiments.

With reference to FIGS. 1 and 5, the upholstery 44 includes an upper tear seam 62 and a lower tear seam 64. The tear seams 62, 64 may be designed to tear apart when subjected to a tensile force above a threshold magnitude. In other words, the upholstery 44 on one side of the tear seam 62, 64 separates from the upholstery 44 on the other side of the tear seam 62, 64 when the force is above the threshold magnitude. The threshold magnitude may be chosen to be greater than forces from, e.g., inadvertent pushing against the seatback 34 by an occupant but be less than forces from the deployment of the airbag 54. Each tear seam 62, 64 may be, for example, a line of perforations through the upholstery 44, a line of thinner upholstery material than the rest of the upholstery 44, etc.

The tear seams 62, 64 may be adjacent the airbag assembly 40; that is, nothing is between the tear seams 62, 64 and the airbag assembly 40. The upper tear seam 62 may be adjacent the upper section 56 of the airbag 54 in the undeployed position, and the lower tear seam 64 may be adjacent the lower section 58 of the airbag 54 in the undeployed position. During deployment, the upper section 56 may deploy toward and through the upper tear seam 62, and the lower section 58 may deploy toward and through the lower tear seam 64.

The airbag assembly 40 includes an inflator 66 fixed to or fixed relative to the frame 42. The inflator 66 is in communication with the airbag 54. Upon receiving a signal from, e.g., a vehicle controller (not shown), the inflator 66 may inflate the airbag 54 with an inflation medium, such as a gas. The inflator 66 may be, for example, a pyrotechnic inflator that uses a chemical reaction to drive inflation medium to the airbag 54. The inflator 66 may be of any suitable type, for example, a cold-gas inflator.

Figure 3A:
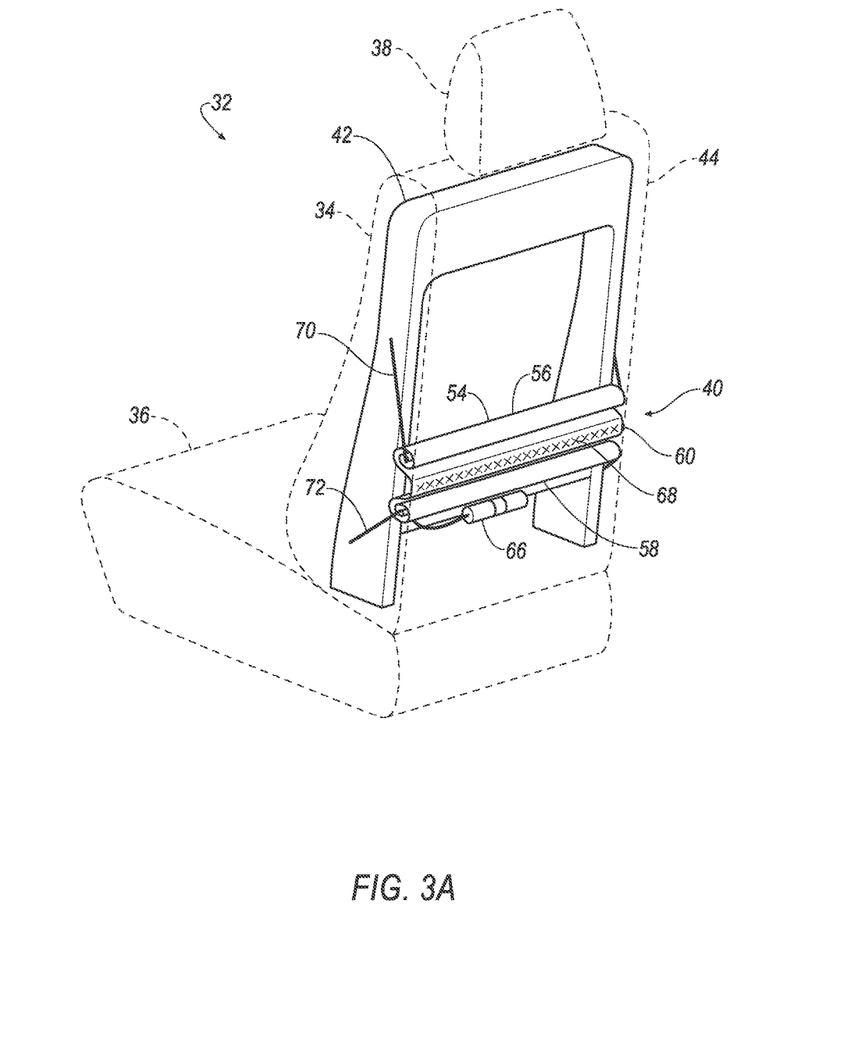
FIG. 3A is a perspective view of a seat with the airbag assembly in the undeployed position.
Figure 3B:
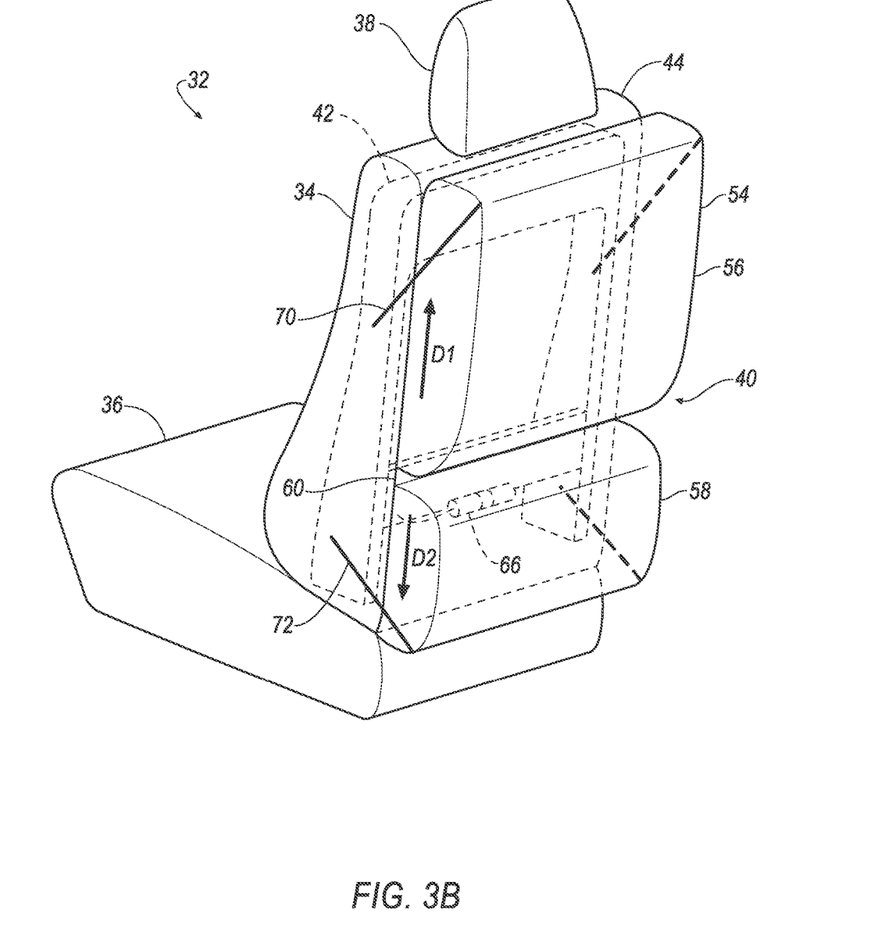
FIG. 3B is a perspective view of the seat with the airbag assembly in the deployed position.
Figure 4:
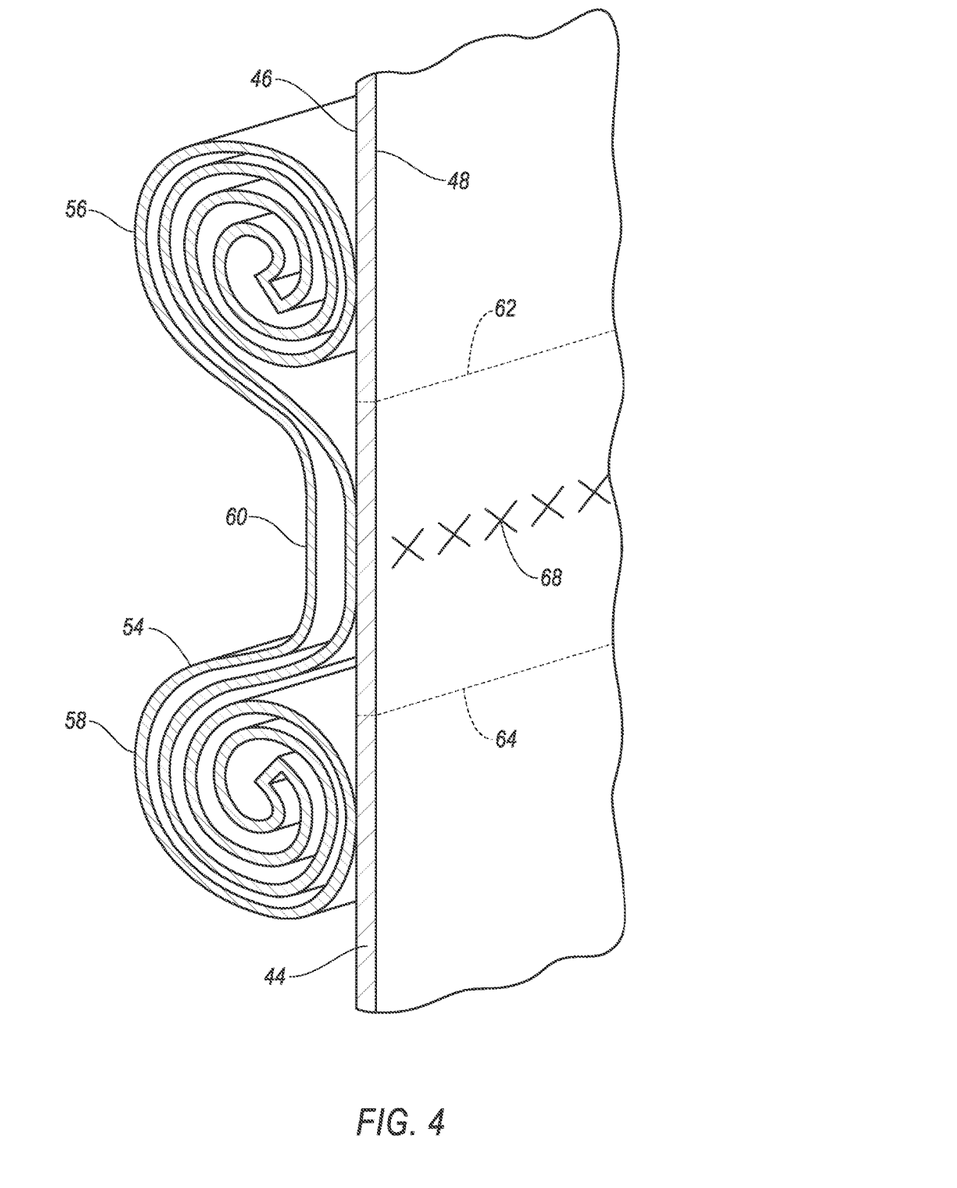
FIG. 4 is a perspective view of a portion of upholstery of the seat and the airbag assembly in the undeployed position.

With reference to FIGS. 3A-4, a first embodiment of the seat 32 may include stitching 68 and tethers 70, 72.

With reference to FIGS. 3A and 4, the airbag 54 of the airbag assembly 40 may be stitched with stitching 68 to the inner surface 46 of the upholstery 44. Specifically, the middle section 60 of the airbag 54 may be stitched to the inner surface 46 of the upholstery 44 between the upper tear seam 62 and the lower tear seam 64. The stitching 68 may pass through the upholstery 44 from the inner surface 46 to the outer surface 48 or may only pass partially through the upholstery 44. The stitching 68 may be continuous along the middle section 60 across an entire width of the seatback 34, as shown in FIG. 3A, or the stitching 68 may cover only a portion of the width of the seatback 34, or the stitching 68 may be divided into sections. The stitching 68 may be formed of any sufficiently strong natural or synthetic thread, such as cotton, nylon, etc.

With reference to FIGS. 3A-B, the tethers 70, 72 may extend from the airbag 54 to the seatback 34, e.g., to the frame 42 of the seatback 34. For example, first tethers 70 may extend from the seatback 34 to the upper section 56, and second tethers 72 may extend from the seatback 34 to the lower section 58. (The adjectives "first" and "second" are used throughout this document as identifiers and are not intended to signify importance or order.)

The first tethers 70 may extend from the seatback 34 to the upper section 56 in a direction toward the middle section 60 when the airbag 54 is in the undeployed position, as shown in FIG. 3A, and the first tethers 70 may extend from the seatback 34 to the upper section 56 in a direction away from the middle section 60 when the airbag 54 is in the deployed position, as shown in FIG. 3B. The first tethers 70 provide more slack in an upward direction than in a vehicle-rearward direction. The first tethers 70 guide the upper section 56 upward during deployment of the airbag 54.

The second tethers 72 may extend from the seatback 34 to the lower section 58 in a direction toward the middle section 60 when the airbag 54 is in the undeployed position, as shown in FIG. 3A, and the second tethers 72 may extend from the seatback 34 to the lower section 58 in a direction away from the middle section 60 when the airbag 54 is in the deployed position, as shown in FIG. 3B. The second tethers 72 provide more slack in a downward direction than in a vehicle-rearward direction. The second tethers 72 guide the lower section 58 downward during deployment of the airbag 54.

Figure 5A:
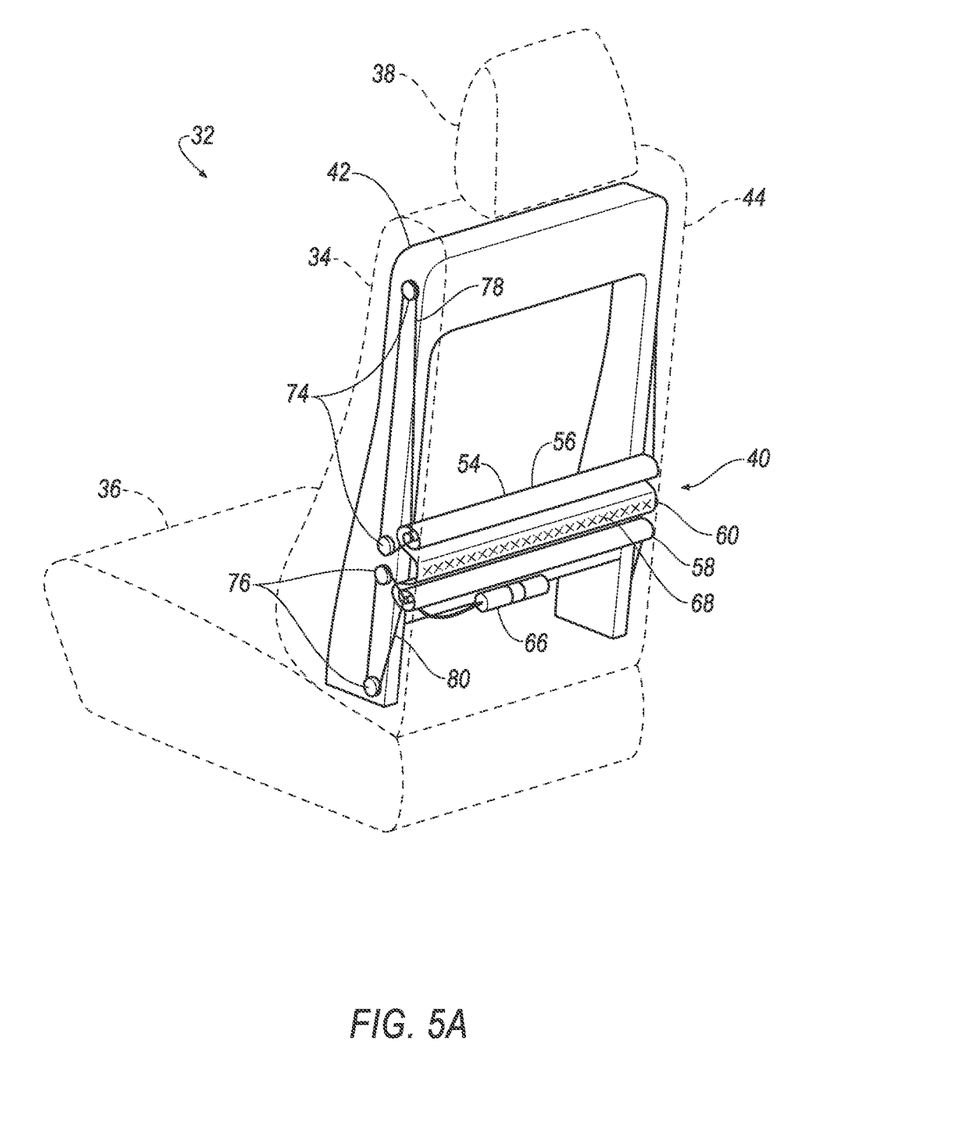
FIG. 5A is a perspective view of a second embodiment of the seat with the airbag assembly in the undeployed position.
Figure 5B:
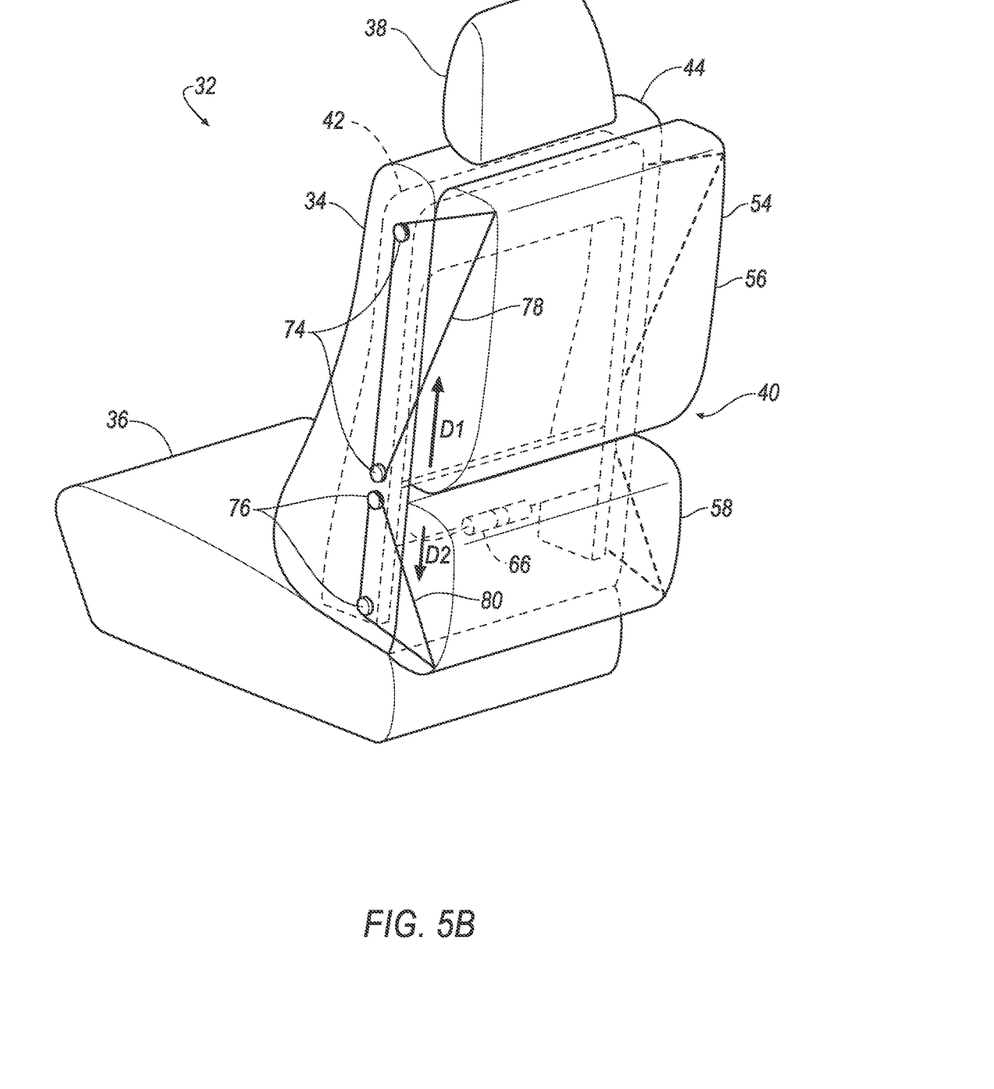
FIG. 5B is a perspective view of the second embodiment of the seat with the airbag assembly in the deployed position.

With reference to FIGS. 4-5B, a second embodiment of the seat 32 may include the stitching 68, pulleys 74, 76, and guide wires 78, 80.

With reference to FIGS. 4 and 5A, the airbag 54 of the airbag assembly 40 may be stitched with stitching 68 to the inner surface 46 of the upholstery 44, as described above with respect to the first embodiment of the seat 32.

With reference to FIGS. 5A-B, the pulleys 74, 76 may be supported by the frame 42. A first pair of pulleys 74 may be supported on one side of the frame 42, and a symmetrical pair of pulleys (not shown) may be supported on the other side of the frame 42. A second pair of pulleys 76 may be supported on the frame 42, and a symmetrical pair of pulleys (not shown) may be supported on the other side of the frame 42.

With continued reference to FIGS. 5A-B, a first guide wire 78 may extend around the first pair of pulleys 74 and be fixed to the airbag 54. The first guide wire 78 may be attached to one of the upper section 56 and the lower section 58, specifically, as shown in FIGS. 5A-B, to the upper section 56. The first guide wire 78 may be loop-shaped, i.e., closed and continuous. The first guide wire 78 may be configured to extend around the pulleys 74; for example, the first guide wire 78 may be sized so as to extend around the first pair of pulleys 74 without slack.

A second guide wire 80 may extend around the second pair of pulleys 76 and be fixed to the airbag 54. The second guide wire 80 may be attached to the other of the upper section 56 and the lower than the first guide wire 78, specifically, as shown in FIGS. 5A-B, to the lower section 58. The second guide wire 80 may be loop-shaped, i.e., closed and continuous. The second guide wire 80 may be configured to extend around the pulleys 76; for example, the second guide wire 80 may be sized so as to extend around the second pair of pulleys 76 without slack.

The guide wires 78, 80 may be formed of any suitably strong and flexible material, e.g., wound metal wires, plastic thread, etc.

Figure 6A:
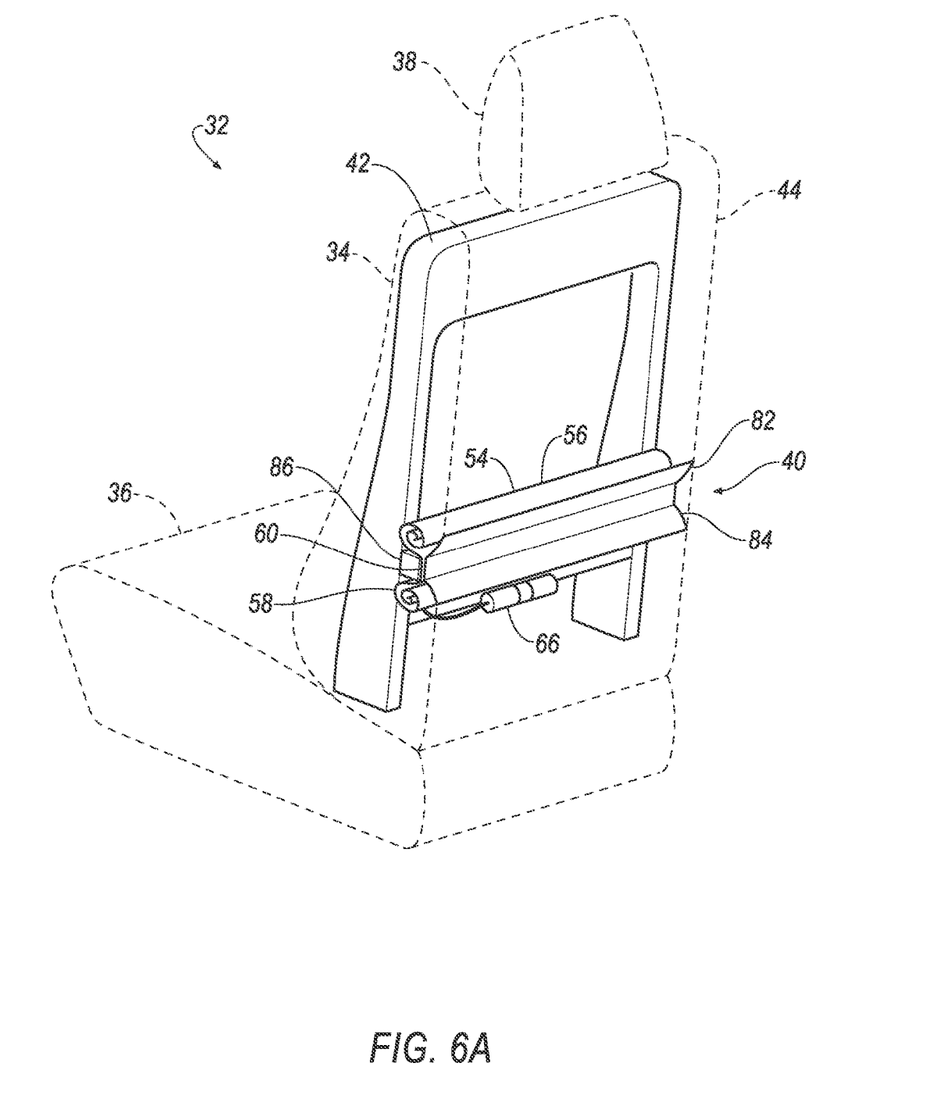
FIG. 6A is a perspective view of a third embodiment of the seat with the airbag assembly in the undeployed position.
Figure 6B:
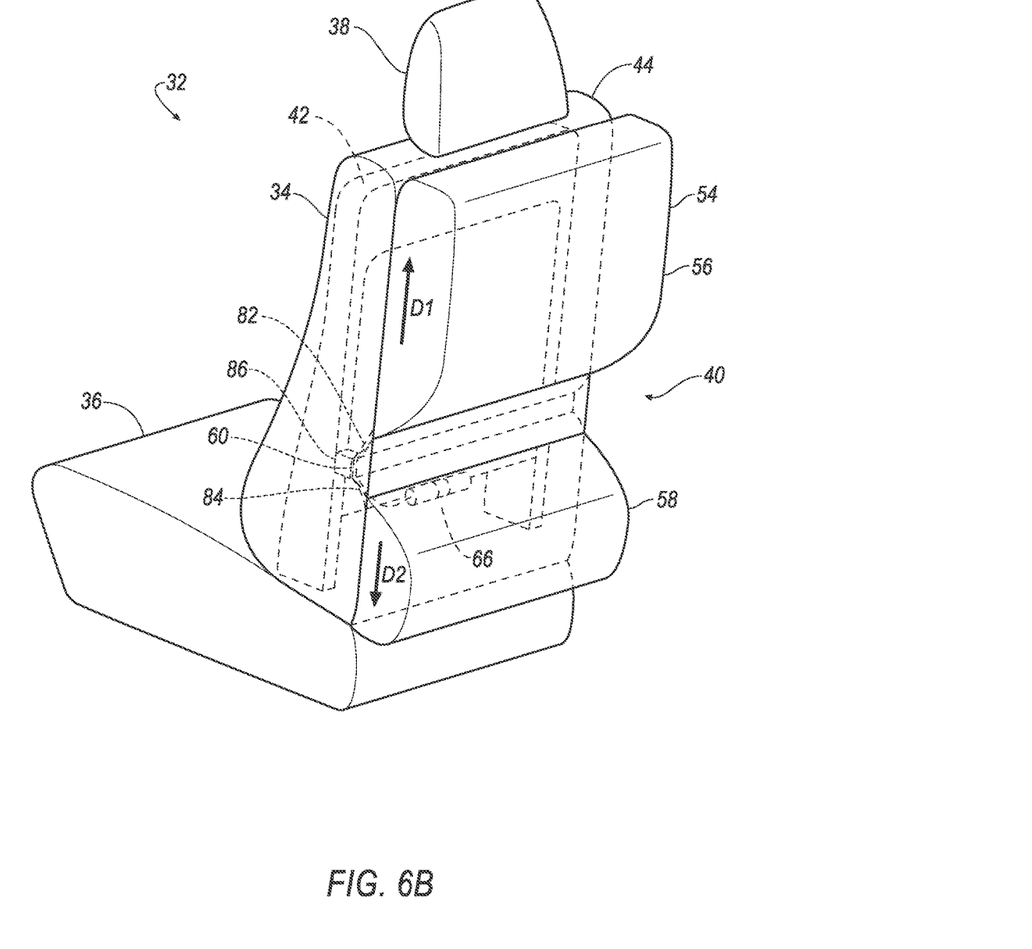
FIG. 6B is a perspective view of the third embodiment of the seat with the airbag assembly in the deployed position.

With reference to FIGS. 6A-B, in a third embodiment of the seat 32, the airbag assembly 40 may include chutes 82, 84. In the third embodiment, the airbag 54 may be fixed to the frame 42; for example, the airbag 54 may be fixed to a cross beam 86 of the frame 42. The airbag 54 may be, e.g., stitched or adhesively attached to the cross beam 86.

With continued reference to FIGS. 6A-B, the airbag assembly 40 includes an upper chute 82 adjacent the upper section 56 of the airbag 54 and a lower chute 84 adjacent the lower section 58 of the airbag 54. In other words, nothing is between the upper chute 82 and the upper section 56, and nothing is between the lower chute 84 and the lower section 58.

The upper chute 82 and the lower chute 84 may be fixed to the airbag 54 at the middle section 60, e.g., with adhesive. As another example, the upper chute 82 and the lower chute 84 may abut the airbag 54, i.e., disconnected from and touching the airbag 54. The upper chute 82 and the lower chute 84 are fixed to the inner surface 46 of the upholstery 44. In other words, the upper chute 82 and the lower chute 84 are attached directly to the inner surface 46 of the upholstery 44, for example, with adhesive.

The upper chute 82 and the lower chute 84 may be, for example, plastic, or any other suitable material. The upper chute 82 may curve upwardly toward the first direction D1, and the lower chute 84 may curve downwardly toward the second direction D2. The upper chute 82 and the lower chute 84 are designed to, i.e., sized, shaped, formed of selected material, etc., to direct the upper section 56 in the first direction D1 and to direct the lower section 58 in the second direction D2.

In the event of a frontal impact to the vehicle 30, an impact sensor (not shown) may detect the impact and transmit a signal to the vehicle controller (not shown), which may transmit a signal to the inflator 66. The inflator 66 may discharge and deploy the airbag 54. The upper section 56 deploys toward and tears through the upper tear seam 62, and the lower section 58 deploys toward and tears through the lower tear seam 64. Depending on the embodiment, either the first tethers 70, the first guide wire 78, or the upper chute 82 direct the upper section 56 during deployment upward parallel to the seatback 34. Likewise, either the second tethers 72, the second guide wire 80, or the lower chute 84 direct the lower section 58 during deployment downward parallel to the seatback 34. The airbag 54 in the deployed position provides coverage of the seatback 34 so as to absorb impact energy for knees and a head of an occupant seated behind the seat 32, potentially reducing injuries.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
a seatback including a frame and an upholstery supported by the frame, the upholstery including an inner surface facing the frame; and
an airbag assembly fixed to the inner surface of the upholstery, wherein the airbag assembly includes an airbag stitched to the inner surface of the upholstery.

2. The seat of claim 1, wherein the airbag assembly includes an airbag, and further comprising a tether extending from the airbag to the frame.

3. The seat of claim 1, wherein the airbag assembly includes an airbag having an upper section deployable in a first direction and a lower section deployable in a second direction opposite the first direction.

4. The seat of claim 3, wherein the airbag includes a middle section extending from the upper section to the lower section, the middle section being stitched to the inner surface of the upholstery.

5. The seat of claim 4, wherein the upholstery includes an upper tear seam and a lower tear seam, and the middle section of the airbag is stitched to the inner surface between the upper tear seam and the lower tear seam.

6. The seat of claim 3, wherein the airbag assembly includes an upper chute adjacent the upper section of the airbag, and a lower chute adjacent the lower section of the airbag.

7. The seat of claim 6, wherein the airbag is fixed to the frame, and the upper chute and the lower chute are fixed to the inner surface of the upholstery.

8. The seat of claim 3, further comprising a tether extending from the seatback to one of the upper section and the lower section.

9. The seat of claim 8, further comprising a second tether extending from the seatback to the other of the upper section and the lower section.

10. The seat of claim 1, wherein the airbag assembly includes an airbag, and further comprising a pair of pulleys supported by the frame, and a guide wire extending around the pulleys and fixed to the airbag.

11. The seat of claim 10, wherein the guide wire is loop-shaped.

12. The seat of claim 1, wherein the airbag assembly includes an inflator fixed to the frame.

13. The seat of claim 1, wherein the upholstery includes a tear seam adjacent the airbag assembly.

14. An airbag assembly comprising:
an airbag including an upper section deployable in a first direction and a lower section deployable in a second direction opposite the first direction;
a pair of pulleys;
a guide wire attached to one of the upper section and the lower section and configured to extend around the pulleys; a second pair of pulleys; and
a second guide wire attached to the other of the upper section and the lower section, the second guide wire being configured to extend around the pulleys of the second pair of pulleys.

15. The airbag assembly of claim 14, wherein the guide wire is loop-shaped.

16. The airbag assembly of claim 14, further comprising an inflator in communication with the airbag.

17. A seat comprising:
a seatback including a frame and an upholstery supported by the frame, the upholstery including an inner surface facing the frame; and
an airbag assembly fixed to the inner surface of the upholstery;
wherein the airbag assembly includes an airbag having an upper section deployable in a first direction and a lower section deployable in a second direction opposite the first direction; and
the airbag assembly includes an upper chute adjacent the upper section of the airbag, and a lower chute adjacent the lower section of the airbag.

18. The seat of claim 17, wherein the airbag assembly includes an airbag stitched to the inner surface of the upholstery.

19. A seat comprising:
a seatback including a frame and an upholstery supported by the frame, the upholstery including an inner surface facing the frame;
an airbag assembly fixed to the inner surface of the upholstery, wherein the airbag assembly includes an airbag having an upper section deployable in a first direction and a lower section deployable in a second direction opposite the first direction; and a tether extending from the seatback to one of the upper section and the lower section.

20. A seat comprising:

a seatback including a frame and an upholstery supported by the frame, the upholstery including an inner surface facing the frame;

an airbag assembly fixed to the inner surface of the upholstery, wherein the airbag assembly includes an airbag;

a pair of pulleys supported by the frame; and a guide wire extending around the pulleys and fixed to the airbag.

* * * * *